United States Patent [19]

Fanning

[11] Patent Number: 5,759,400

[45] Date of Patent: Jun. 2, 1998

[54] RETICULATED FOAM STRUCTURED FLUID TREATMENT ELEMENT

[75] Inventor: Chris E. Fanning, Okla. City, Okla.

[73] Assignee: Advance Waste Reduction, Oklahoma City, Okla.

[21] Appl. No.: 749,584

[22] Filed: Nov. 5, 1996

Related U.S. Application Data

[63] Continuation of Ser. No. 321,279, Oct. 11, 1994, Pat. No. 5,599,456, which is a continuation-in-part of Ser. No. 117,265, Sep. 3, 1993, abandoned.

[51] Int. Cl.$^6$ .............................................. B01D 24/00
[52] U.S. Cl. ............................................... 210/510.1
[58] Field of Search ........................ 210/501, 510.1; 428/550, 553, 566

[56] References Cited

U.S. PATENT DOCUMENTS

| | | | |
|---|---|---|---|
| 2,297,817 | 10/1942 | Truxell, Jr. et al. | 210/205 |
| 2,576,610 | 11/1951 | Kunzog | 138/41 |
| 3,078,552 | 2/1963 | Grandey | 428/566 |
| 3,598,243 | 8/1971 | Gutkowski | 210/340 |
| 3,821,018 | 6/1974 | Grant | 428/550 |
| 3,844,011 | 10/1974 | Davies | 428/550 |
| 3,890,254 | 6/1975 | Guthrie | 260/2.5 BD |
| 4,256,470 | 3/1981 | Zajicek et al. | 55/48 |
| 4,283,465 | 8/1981 | Morimoto et al. | 428/566 |
| 4,517,069 | 5/1985 | Harney | 204/290 F |
| 4,613,369 | 9/1986 | Koehler | 428/550 |
| 4,642,192 | 2/1987 | Heskett | 210/638 |
| 4,687,553 | 8/1987 | Solomon | 204/16 |
| 4,717,629 | 1/1988 | Ishikawa et al. | 428/566 |
| 4,822,692 | 4/1989 | Koehler | 428/547 |
| 4,975,230 | 12/1990 | Pinkhasov | 264/59 |
| 5,122,274 | 6/1992 | Heskett | 210/638 |
| 5,135,654 | 8/1992 | Heskett | 210/638 |
| 5,149,437 | 9/1992 | Wilkinson et al. | 210/757 |
| 5,151,222 | 9/1992 | Ruffoni | 252/511 |
| 5,185,381 | 2/1993 | Ruffoni | 521/52 |

OTHER PUBLICATIONS

Brochure: KDF Process Media, KDF Fluid Treatment, Inc. Constantine, Michigan (undated).
Brochure: AmPorOx, AstroMet, Inc., Cincinnati, Ohio (undated).

*Primary Examiner*—Ivars Cintins
*Attorney, Agent, or Firm*—Dunlap & Codding, P.C

[57] ABSTRACT

A method for treating a fluid or gas containing contaminants wherein the fluid or gas is passed through a contactor having at least one reticulated foam structured fluid treatment element formed from metal particles bound together in an interconnected form and capable of promoting a reduction/oxidation reaction between the contaminants and the reticulated foam structured fluid treatment element. The metal particles employed in the fabrication of the reticulated foam structured fluid treatment element are selected from a group of particles comprising zinc, copper or combinations thereof.

7 Claims, 1 Drawing Sheet

RETICULATED FOAM STRUCTURED FLUID TREATMENT ELEMENT

REFERENCE TO RELATED APPLICATIONS

This application is a continuation of copending application U.S. Ser. No. 08/321,279, entitled "FLUID TREATMENT UTILIZING A RETICULATED FOAM STRUCTURED MEDIA CONSISTING OF METAL PARTICLES", file Oct. 11, 1994, now U.S. Pat. No. 5,599,456 which is a continuation-in-part application of U.S. patent application Ser. No. 08/117,265 entitled FILTERING METHOD WHERE FLUID OR GAS IS PASSED THROUGH FILTER ELEMENT OF METAL PARTICLES INTERCONNECTED IN SPONGE-LIKE FORM, filed Sep. 3, 1993, now abandoned.

FIELD OF THE INVENTION

The present invention relates generally to fluid treatment systems and, more particularly, but not by way of limitation, to a fluid contactor containing reticulated foam structured fluid treatment media elements of metal particles for effectively reducing the amounts of chlorine and heavy metals and other contaminants present in a fluid while controlling bacterial growth in the fluid.

BRIEF DESCRIPTION OF THE DRAWINGS

The single figure of drawings is a diagrammatic, partial sectional view of a fluid treatment system constructed in accordance with the present invention wherein a fluid is passed through a fluid contactor containing reticulated foam structured fluid treatment media elements comprising metal particles.

DESCRIPTION OF THE PREFERRED EMBODIMENTS

Figure 1:
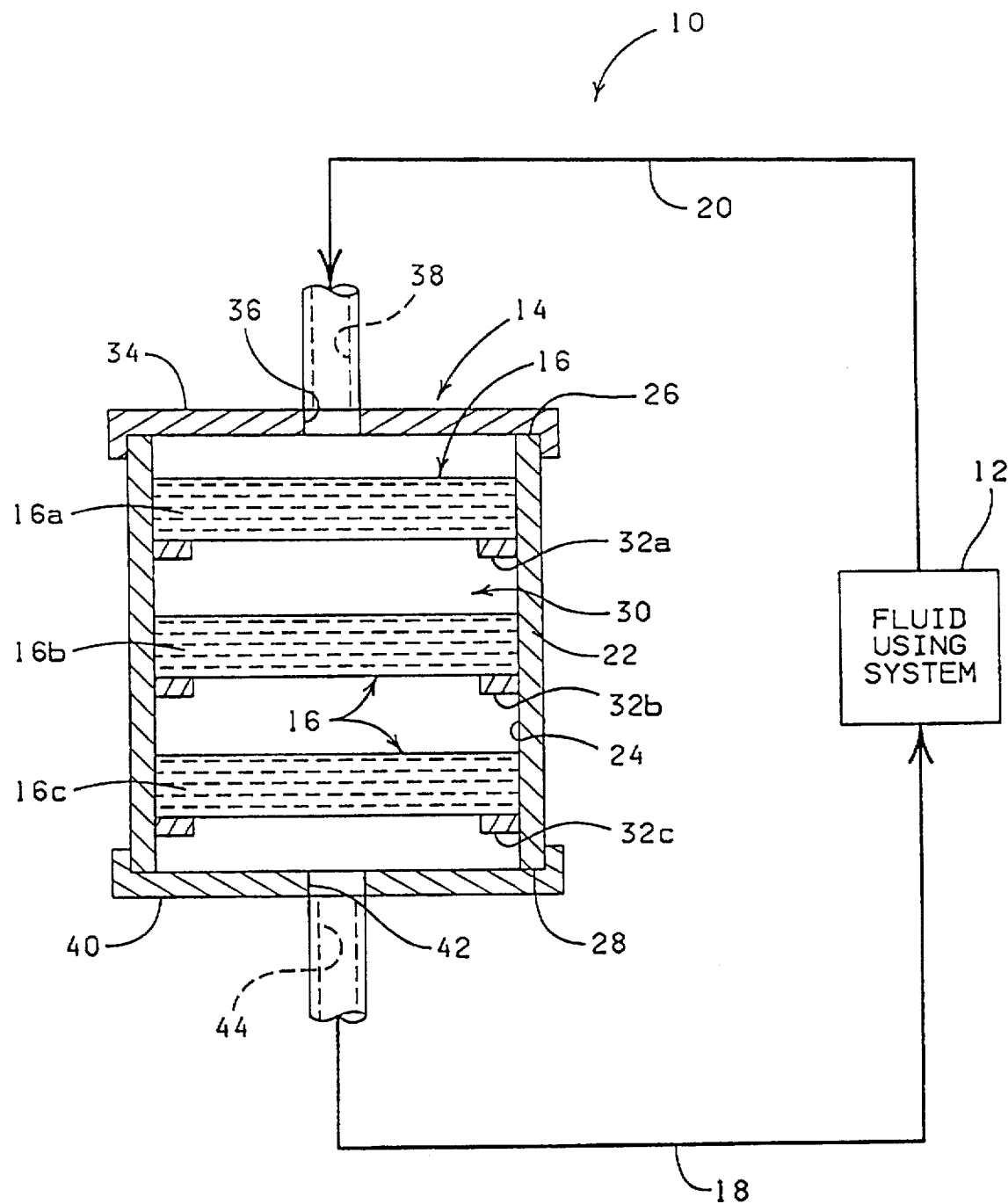

Shown in FIG. 1 is a fluid treatment system 10 which is constructed and operates in accordance with the present invention.

The fluid treatment system 10 includes a fluid using system 12 and a fluid contactor 14 containing reticulated foam structured fluid treatment media elements 16 capable of promoting a reduction/oxidation reaction between the reticulated foam structured fluid treatment media elements 16 and contaminants present in the fluid and thereby substantially removing and/or reducing the amount of contaminates, such as chlorine, dissolved heavy metal ions (arsenic, cadmium chromium VI, chromium III, selenium, and mercury), sulfur, iron and the like from the fluid. The reticulated foam structured fluid treatment media elements 16 provide high flow rates and low restriction so as to provide maximum surface area contact of the fluid flowing therethrough and thereby enhance an oxidation/reduction reaction between the contaminants in the fluid and the reticulated foam structured fluid treatment media elements 16.

The fluid using system 12 can be any system employing a fluid where it is desirable to reduce the amount of contaminates present in the fluid and such contaminants are capable of undergoing a reduction/oxidation reaction and where it is also desirable to control the growth of microorganisms, such as bacteria, algae and fungus in the fluid. For example, the fluid using system 12 of the fluid treatment system 10 may include a cooling tower wherein water (fluid) is circulated through the cooling tower; and the cooling tower water is passed through the fluid contactor 14 and into contact with the reticulated foam structured fluid treatment media elements 16 to reduce or substantially eliminate chlorine and heavy metal ions in the cooling tower water, while at the same time substantially eliminating the growth of microorganisms in the cooling tower water. In another example, the fluid using system 12 may include a milling machine or a drilling machine wherein oil (fluid) or other lubricant is circulated through the milling or drilling machine; and the contaminated fluid is subsequently passed through the fluid contactor 14 and into contact with the reticulated foam structured fluid treatment media elements 16 to reduce or substantially eliminate heavy metals present in the oil resulting from the milling or drilling process and to prevent growth of microorganisms in such fluid. In one other example, the fluid using system 12 may include a gas dehydrator of the type where glycol (fluid) is circulated through the gas dehydrator or a gas well producing hydrogen sulfide gas; and the contaminated glycol or hydrogen sulfide gas is passed through the fluid contactor 14 and into contact with the reticulated foam structured fluid treatment media elements 16 to remove contaminants, such as sulfur, iron, chlorine or heavy metal ions present in the glycol or hydrogen sulfide gas while at the same time preventing growth of microorganisms in such fluids. In general, the fluid treatment system 14 of the present invention may be used to remove any contaminants present in a fluid where the contaminants are capable of undergoing a reduction/oxidation reaction when contacted with the reticulated foam structured fluid treatment media elements 16 of the fluid contactor 14.

Fluid, which can be in the liquid state, gaseous state or a combination thereof, is passed into the fluid treatment system 10 via a conduit 18. The fluid is circulated through the fluid treatment system 10 and passed from the fluid treatment system 10 via a conduit 20.

When the fluid is circulated through or passed through the fluid using system 12, the fluid becomes contaminated or is contaminated with contaminants such as chlorine, dissolved heavy metal ions (arsenic, cadmium chromium VI, chromium III, selenium, and mercury), sulfur, iron and the like; and the fluid is susceptible to growth of microorganism. The fluid containing the contaminants is passed from the fluid using system 12 by way of the conduit 20 into the fluid contactor 14 and into contact with the reticulated foam structured fluid treatment media elements 16. The fluid containing the contaminants is passed through the fluid contactor 14 where a substantial portion of the contaminants are removed from the fluid. The fluid, having the substantial portion of the contaminants removed therefrom, is then passed from the fluid contactor 14 through the conduit 18 and recirculated back through the fluid using system 12.

The fluid contactor 14 includes a contactor case 22. In one form, the contactor case 22 is a cylindrically shaped case having an opening 24 formed therethrough and intersecting opposite ends 26 and 28 thereof. The opening 24 cooperates to form a media chamber 30 which is at least partially enclosed by the contactor case 22.

A plurality of spaced apart ring like supports 32 are secured to the contactor case 22 and disposed in the media chamber 30. Three supports 32 are shown in the drawing and designated therein by the individual reference numerals 32a, 32b and 32c.

The fluid contactor 14 includes a plurality of the reticulated foam structured fluid treatment media elements 16. Each of the reticulated foam structured fluid treatment media elements 16 is disposed on one of the supports 28. Each of the supports 28 cooperates to support one of the reticulated foam structured fluid treatment media elements 16 within the media chamber 30 at a predetermined position. Three reticulated foam structured fluid treatment media elements 16 are shown in the drawing and designated by the individual reference numerals 16a, 16b and 16c respectively. More particularly, the reticulated foam structured fluid treatment media element 16a is supported on the support 32a, the reticulated foam structured fluid treatment media element 16b is supported on the support 32b and the reticulated foam structured fluid treatment media element 16c is supported on the support 32c.

A first end cap 34 is disposed over and connected to the contactor case 22 generally adjacent the end 26 of the contactor case 22. A cap opening 36 is formed through the first end cap 34. The cap opening 36 is in fluidic communication with the media chamber 30. One end of the conduit 20 is secured to the first end cap 32. An opening 38 is formed through the conduit 20. The opening 38 is in fluidic communication with the cap opening 36 of the first end cap 34 and thus in fluidic communication with the media chamber 30.

A second end cap 40 is disposed over the end 28 of the contactor case 22 and secured to the contactor case 22. The second end cap 40 closes the end 28 of the contactor case 22. The second end cap 40 has a cap opening 42 formed therethrough in fluidic communication with the media chamber 30. An opening 44 is formed through the conduit 18. The opening 44 is in fluidic communication with the cap opening 42 of the second end cap 40 and thus in fluidic communication with the media chamber 30.

The number of reticulated foam structured fluid treatment media elements 16 and cooperating supports 32 in the fluid contactor 14 will vary depending upon the particular fluid using system 12. The number of reticulated foam structured fluid treatment media elements 16 and cooperating supports 32 in the fluid contactor 14 also will vary depending upon the contaminants in the fluid to be treated, the degree with which such contaminants are to be removed from the fluid and the treatment rate (the rate of the fluid desired to be flowed through the fluid contactor 14 and treated by contact with the reticulated foam structured fluid treatment media elements 16.

The contactor case 22 preferably is constructed of a plastic material or a metal with a plastic lining.

The reticulated foam structured fluid treatment media elements 16 each are identical in construction and operation. Although, it should be noted that, in some applications, the design parameters of each reticulated foam structured fluid treatment media element 16 in a particular fluid contactor 14 may vary if desired in a particular treatment application.

Each reticulated foam structured fluid treatment media element 16 comprises metal particles bound together in an interconnected form of a porous metal, sponge-like structure wherein one (1) cubic inch of the porous metal, sponge-like structure has at least about 325 square inches of surface area. The metal particles employed in the reticulated foam structured fluid treatment media elements 16 are selected from a group of particles comprising zinc and copper, or zinc, or copper, or combinations thereof. The metal particles preferably are of the type described in U.S. Pat. No. 5,135,654, titled "Method for Treating Fluids" issued to Heskett, Aug. 4, 1992, and U.S. Pat. No. 4,642,192 titled "Method of Treating Fluids" issued to Heskett, Feb. 10, 1987, and U.S. Pat. No. 5,122,274, titled "Method of Treating Fluids" issued to Heskett, Jun. 16, 1992 and the disclosures of each of these three patents specifically hereby are incorporated herein by reference.

The metal particles employed in the preparation of the reticulated foam structured fluid treatment media elements 16 are particles of a copper/zinc alloy commercially available from Fluid Treatment, Inc. of Constantine, Michigan and sold under their mark KDF. More particularly, particles of a copper/zinc alloy sold by this company and identified by the mark KDF-55 have been found useful in forming the reticulated foam structured fluid treatment media elements 16 of the present invention.

The commercially available metal particles described before are in a powder-like form having an average mesh size of about 200 mesh, based on U.S. Standard screen sizes. To form the reticulated foam structured fluid treatment media elements 16 which have a sponge-like structure contemplated by the present invention, wherein one (1) cubic inch of the reticulated foam structured fluid treatment media elements 16 has a surface area of about 325 square inches or more, polyethylene foam is cut to form a substrate having a desired size and shape. The polyethylene substrate is then submerged into a solvent for a period of time effective to provide the polyethylene substrate with a tacky surface. Copper powder is then mixed with a binder to form a slurry and the slurry is applied to the polyethylene substrate. The tacky surface of the polyethylene insures that a substantially uniform coating of the slurry containing copper powder sticks to the surface of the polyethylene substrate.

The slurry coated polyethylene substrate is allowed to dry under ambient conditions and then placed in a furnace maintained at from about 1950 to about 2150 degrees F. for a period of time effective to evaporate the polyethylene substrate and produce a foam structure consisting of copper. During the heating of the slurry coated polyethylene substrate the furnace is flooded with hydrogen gas.

A 200 mesh powder consisting of metal particles (KDF-55) is admixed with a binder to form a slurry and the slurry is applied to the foam structure of copper. The slurry coated foam structure is allowed to dry under ambient conditions and the resulting hardened structure is then placed in a furnace flooded with hydrogen gas and maintained at from about 1950 to about 2150 degrees F. for a period of time effective to sinter the copper/zinc alloy and to insure that any trace amounts of foreign material, such as binder and polyethylene, have been gassed off. After the sintering of the copper/zinc alloy has been completed and the impurities have been gassed off, the reticulated foam structured fluid treatment media element so produced is then removed from the furnace and allowed to slowly cool to ambient temperature. The reticulated foam structured fluid treatment media elements so produced have a sponge-like structure wherein one (1) cubic inch of the reticulated foam structured fluid treatment media elements has a surface area of about 350 square inches.

The method for forming a reticulated foam structure having sponge-like structures of metal or ceramics is well known in the art and such structures are commercially available at companies such as Astromet, Inc. of Cincinnati, Ohio.

The various parameters of the reticulated foam structured fluid treatment media elements 16 such as pore size and density may be varied to fit a particular treatment application. Preferably, the pore size of the reticulated foam structured fluid treatment media elements 16 is in a range from about 10 microns to about ¼ of an inch and the reticulated foam structured fluid treatment media elements 16 contain from about 25 percent to about 5 percent of the copper/zinc alloy.

In order to further illustrate the present invention, the following examples are given. However, it is to be understood that the examples are for illustrative purposes only and are not to be construed as limiting the scope of the present invention.

EXAMPLE I

Three (3) tubes having a 4 inch ID were each packed with 30 pounds of granules having a mesh size ranging from about −10 to about +100 mesh (U.S. standard screen size) to provide each tube with a loose bed of granules having a height of about 15 inches. The granules consisted of a heterogeneous copper/zinc alloy and are commercially available from Fluid Treatment, Inc. of Constantine, Michigan under the mark KDF-55.

Water containing chlorine, heavy metals and microorganisms was pumped through the beds of granules at a maximum flow rate of about 6 gallons per minute per square foot of the loosely packed granules. The flow rated of the water through the beds of granules was dependent upon the pump limitations employed to pump the water and the acceptance limitations of the bed of granules.

Water exiting the bed of loosely packed granules of the heterogeneous copper/zinc alloy was tested and determined to be substantially free of chlorine, heavy metals and microorganisms.

EXAMPLE II

Three (3) 20" tubes having approximately a 4 inch ID were connected in parallel and each tube contained 9 spatially disposed reticulated foam structured fluid treatment media elements having a diameter of about 4 inches and a thickness of about 1 inch. Each of the reticulated foam structured fluid treatment elements was fabricated using 2.8 grams of the same heterogeneous copper/zinc alloy employed to provide the bed of loosely packed granules of Example 1, except that the heterogeneous copper/zinc alloy was in powder form having an average mesh size of about 200.

Water contaminated with micro-organisms, chlorine and heavy metals was pumped through the three tubes containing the reticulated foam structured fluid treatment media elements at a flow rate of about 15 gallons per minute. The water composition was substantially the same as the water composition employed in Example 1.

Water exiting the three tubes containing the reticulated foam structured fluid treatment media elements was tested and determined to be substantially free of chlorine, heavy metals and micro-organisms.

EXAMPLE III

Three (3) 20" tubes having approximately a 4 inch ID were connected in parallel and each tube contained 9 spatially disposed reticulated foam structured fluid treatment media elements having a diameter of about 4 inches and a thickness of about 1 inch. Each of the reticulated foam structured fluid treatment elements was fabricated using 2.8 grams of the same heterogeneous copper/zinc alloy employed to provide the bed of loosely packed granules of Example I, except that the heterogeneous copper/zinc alloy was in powder form having an average mesh size of 200.

Water was continuously pumped through the three tubes containing the reticulated foam structured fluid treatment media elements at a flow rate of 20 gallons per minute. The water treated by passage through the reticulated foam structured fluid treatment media elements was periodically check and determined to be substantially free of chlorine, heavy metals and micro-organisms.

After approximately four (4) months no decrease in the flow rate of water through the reticulated foam structured fluid treatment media elements was detected; there was no apparent deterioration of the reticulated foam structured fluid treatment media elements and water treated by passage through the reticulated foam structured fluid treatment media elements was determined to be substantially free of chlorine, heavy metals and micro-organisms.

It should be noted that the flow rate of the water through the reticulated foam structured fluid treatment media elements was maintained at 20 gallon per minute in order to provide a direct comparison between the use of the reticulated foam structured fluid treatment media elements and the loosely packed beds containing granules of the heterogeneous copper/zinc alloy of Example I.

EXAMPLE IV

Three (3) 20" tubes having approximately a 4 inch ID were connected in parallel and each tube contained 9 spatially disposed reticulated foam structured fluid treatment media elements having a diameter of about 4 inches and a thickness of about 1 inch. Each of the reticulated foam structured fluid treatment elements was fabricated using 2.8 grams of the same heterogeneous copper/zinc alloy of Example II.

Water was continuously pumped through the three tubes containing the reticulated foam structured fluid treatment media elements at a flow rate of 150 gallons per minute. The water treated by passage through the reticulated foam structured fluid treatment media elements was periodically check and determined to be substantially free of chlorine, heavy metals and micro-organisms.

EXAMPLE V

Five (5) 48" tubes having approximately a 4 inch ID were connected in parallel and each tube contained 39 spatially disposed reticulated foam structured fluid treatment media elements having a diameter of about 4 inches and a thickness of about ½ inch. Each of the reticulated foam structured fluid treatment elements was fabricated using 1.4 grams of the same heterogeneous zinc/copper alloy of Example II.

Water was continuously pumped through the three tubes containing the reticulated foam structured fluid treatment media elements at a flow rate of 350 gallons per minute. The water treated by passage through the reticulated foam structured fluid treatment media elements was periodically check and determined to be substantially free of chlorine, heavy metals and micro-organisms.

Changes may be made in the steps or the sequence of steps of the methods described herein without departing from the spirit and the scope of the invention as defined in the following claims.

What is claimed is:

1. A reticulated foam structured fluid element for treatment of a fluid containing contaminates capable of undergoing a reduction/oxidation reaction such that, upon passage of fluid through the reticulated foam structured fluid treatment element, a treated fluid is produced which is substantially free of such contaminates and which is substantially resistant to growth of microorganisms in the treated fluid, the reticulated foam structured fluid treatment element comprising:

a foamed substrate formed of zinc or copper; and particles of zinc, copper or a copper/zinc alloy bound together on the foamed substrate in an interconnected form such that one cubic inch of the reticulated foam structured fluid treatment element has a surface area of at least about 350 square inches.

2. The reticulated foam structured fluid treatment element of claim 1 wherein the reticulated foam structured fluid treatment element is further characterized as having a pore size of from about 10 microns to about ¼ of an inch and wherein the particles are particles of a copper/zinc alloy.

3. The reticulated foam structured fluid treatment element of claim 2 wherein the reticulated foam structured fluid treatment element contains from about 5 to about 25 percent of the copper/zinc alloy.

4. The reticulated foam structured fluid treatment element of claim 1 wherein the reticulated foam structured fluid treatment element contains from about 5 to about 25 percent of the particles of zinc, copper or a copper/zinc alloy.

5. The reticulated foam structured fluid treatment element of claim 1 wherein the contaminants removable from the fluid by passage through the reticulated foam structured fluid treatment element are chlorine, heavy metals, sulfur, iron and combinations thereof and wherein the foamed substrate is formed of copper and wherein the particles are a copper/zinc alloy.

6. The reticulated foam structured fluid treatment element of claim 5 wherein the reticulated foam structured fluid treatment element contains from about 5 to about 25 percent of the copper/zinc alloy.

7. The reticulated foam structured fluid treatment element of claim 6 wherein the reticulated foam structured fluid treatment element is further characterized as having a pore size of from about 10 microns to about ¼ of an inch.

* * * * *